United States Patent Office
3,123,647
Patented Mar. 3, 1964

3,123,647
BIS-p,p-DI(1,3-DIHYDROXY BENZOYL) BENZENE
Max Duennenberger, Birsfelden, Adolf Emil Siegrist, Basel, and Erwin Maeder, Muenchenstein, Switzerland, assignors to Ciba Limited, Basel, Switzerland
No Drawing. Filed Dec. 4, 1958, Ser. No. 778,072
Claims priority, application Switzerland Dec. 6, 1957
1 Claim. (Cl. 260—591)

This is a continuation-in-part of our application Serial No. 720,527, now abandoned.

This invention provides new hydroxy-ketones, which like, for example, the ketone of the formula (1) 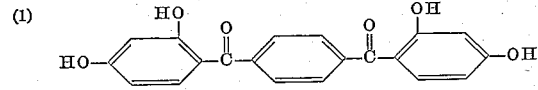

correspond to the general formula (2) 

in which $R_1$ represents a radical of the benzene series which contains a hydroxyl group in ortho-position to the —CO— group and a hydroxy group, which may be etherified, in paraposition to the —CO-groups and $R_2$ represents a cyclic radical.

These new compounds are obtained by methods in themselves known, for example, by reacting a cyclic dicarboxylic acid dihalide in the presence of a Friedel-Crafts catalyst with a compound of the benzene series which contains two hydroxyl groups being in meta-position to one another and in which compound one or both hydroxyl groups may be etherified.

The cyclic dicarboxylic acid dihalides, advantageously the acid chlorides, used as starting materials may contain as the ring system, for example, a heterocyclic ring, for example a 5-membered heterocyclic ring, such as pyridine, thiophene or furane, or an aromatic ring. In the case of aromatic compounds they preferably contain benzene rings, for example, two benzene nuclei bound together directly or through a bridge member or contain a single benzene ring. The dicarboxylic acid dihalides may contain further substituents in the ring system, for example, free or etherified hydroxyl groups, and in the latter case more especially alkoxy groups of low molecular weight, such as ethoxy or methoxy groups, hydroxyalkoxy groups such as hydroxyethoxy groups, or alkyl groups of low molecular weight such as propyl, ethyl or methyl groups. As examples there may be mentioned the dichlorides obtainable in the usual manner from the following dicarboxylic acids: Pyridine dicarboxylic acids, thiophene-2:5-dicarboxylic acid, furane-2:5-dicarboxylic acid, diphenyl-(1:1')-4:4'-dicarboxylic acid, and benzene dicarboxylic acids, for example, benzene-1:2- or -1:3- or preferably -1:4-dicarboxylic acid.

The other starting materials used in the process of this invention $R_1$ contain two free or etherified hydroxyl groups. There may be used, for example, bicyclic compounds such as diphenyl compounds containing hydroxyl groups or more especially monocyclic compounds. As etherified hydroxyl groups there may be mentioned more especially alkoxy groups or hydroxyalkoxy groups of low molecular weight. In addition to one or more substituents of the latter kind, these compounds may contain further substituents, especially alkyl groups of low molecular weight such as ethyl or methyl groups. Especially suitable are, for example, compounds of the formula (3) 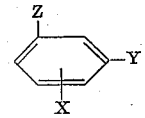

in which X represents a hydrogen atom or an alkyl group, an aryl radical, preferably a benzene radical, a carboxyl group which may be esterified, Y represents a hydroxyl group that may be etherified, and Z represents a hydroxyl group that may be etherified. Good results are also obtained with those compounds of the Formula 3 which contain two hydroxyl groups in meta-position relatively to one another and in which on hydroxyl group or both hydroxyl groups may be etherified.

There may be used, for example, the following compounds: 1:3-dihydroxybenzene, 1-hydroxy - 3 - methoxy-benzene, 1-hydroxy-3-ethoxybenzene, 1:3-dimethoxy- or 1:3 diethoxy-benzene, 1:3-dimethoxy-4-methyl-benzene, 2:4-dihydroxybenzoic acid or an alkyl ester thereof.

For reacting the compounds of the benzene series with the cyclic dicarboxylic acid halides there may be used quite generally Friedel-Crafts catalysts, advantageously aluminum chloride. The reaction can be carried out by a method in itself known, advantageously in an organic solvent which is inert towards the starting materials and the catalyst. The separation and working up of the ketones so obtained can also be carried out by methods in themselves known. The ketones can be obtained in a very pure state by recrystallization from suitable solvents.

The new hydroxy-diketones of the general Formula 2 can also be obtained by reacting the cyclic dicarboxylic acid halide with a hydroxy compound of the benzene series having the composition defined herein before, if desired, isolating the reaction product, and treating the resulting di-ester with a Friedel-Crafts catalyst, advantageously aluminum chloride, to bring about rearrangement to form the corresponding hydroxy-diketone.

The reaction of the dihalides with the compounds of the benzene series to form the di-esters may be carried out by methods in themselves known, for example, in an aqueous medium or in an inert organic solvent, such as benzene, and in the presence of an agent capable of binding hydrogen halide, for example, an alkali metal hydroxide or pyridine. The rearrangement of the di-esters to form the hydroxy-diketones by means of Friedel-Crafts catalysts, advantageously aluminum chloride can also be carired out by methods in themselves known, as also the separation and working up of the hydroxy-diketones so obtained.

When there are used for reaction with the cyclic dicarboxylic acid dihalides in the process hereinbefore described compounds which contain exclusively etherified hydroxyl groups, the etherified hydroxyl groups in ortho-position to the —CO-bridge formed are split up during the reaction, especially at a raised temperature, so that the hydroxy-ketones of the Formula 2 are also obtained from these starting materials.

If desired, further substituents may be introduced into the hydroxy-ketones of the Formula 2 by methods in themselves known. Thus, for example, the ketones may be treated with sulfonating agents, such as sulfuric acid containing free sulfur trioxide (oleum), whereby sulfonic acids are obtained. The sulfonic acids may be converted into sulfonic acid halides in the usual manner, and the latter may be converted by reaction with ammonia or a primary or secondary amine into sulfonic acid amides.

A further method of introducing additional substituents consists in treating the hydroxy-ketones with an aldehyde or an agent yielding an aldehyde and a secondary amine, such as dimethylamine, diethylamine or morpholine, or with the aldehyde-amine addition products. By using an agent yielding formaldehyde, such as trioxymethylene, and a secondary amine, tertiary aminomethyl groups, for example, the group of the formula

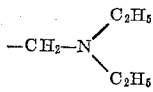

can be introduced.

Finally the hydroxy-ketones may be nitrated, the nitro groups reduced to amino groups, and the latter alkylated or acylated.

The introduction of such substituents proceeds in a specially favorable manner, that is to say, in a substantially unitary manner, in the case of those hydroxy-ketones which contain strongly preferential reaction positions owing to the presence of substituents, for example, the hydroxy-ketone of the above Formula 1 into which one or two additional substituents enter the 5-position of the 2:4-dihydroxy-benzoyl radical in a unitary manner.

The new hydroxy-ketones can be used for a very wide variety of purposes, for example, as intermediate products for the manufacture of dyestuffs.

However, the new hydroxy-ketones are especially valuable as agents for protecting a very wide variety of materials against the action of light. As compared with known compounds of similar constitution, the hydroxy-ketones of this invention are generally advantageous in that they are capable of absorbing ultra-violet rays in a wide range of wavelengths within the limits of about 250 m$\mu$ to 400 m$\mu$ which are known to be especially harmful, and they have a very strong extinction towards such rays. The compounds themselves possess a very good fastness to light and exhibit substantially no absorption above 400 m$\mu$.

The aforesaid two properties constitute an important prerequisite for compounds that are to be useful as agents affording protection against the highly active ultra-violet rays.

Broadly speaking, the new hydroxy-ketones are useful as agents affording protection against light for all those substances in which they can be dissolved (including the formation of so-called solid solutions) or at least brought into a state of fine dispersion, and advantageously microdispersion. Accordingly, they are useful as light-protection agents for the following materials, the hydroxy-ketone being advantageously dissolved in a suitable solvent before it is incorporated in the material to be protected.

(a) For the manufacture of shaped articles, such as spun goods or foils, of certain cellulose derivatives such as viscose spinning compositions, acetyl-cellulose spinning compositions (including cellulose triacetate), polymers, or copolymers of vinyl chloride, vinylidene chloride, methacrylic acid esters, styrene or for the production of compositions for making fully synthetic fibers, such as polyamide melts or polyacrylonitrile spinning compositions, and also for the production of paper pulps (for example, so-called Hollander pulp) for paper making.

(b) Fibrous materials that are not textile materials, and which may be of animal origin such as feathers, hair or pelts or hides and leather obtained from the latter by natural or chemical tanning, and finished manufactured goods made therefrom and also fibrous materials of vegetable origin, such as straw, wood, wood pulp or fibrous materials consisting of compacted fibers, such as paper, paste-board or compressed wood and also manufactured goods made therefrom.

(c) Textile materials in general, which may be in any form, for example, as fibers, filaments, yarn, woven or knitted goods or felt, and manufactured goods made therefrom; such textile materials may consist of natural materials of animal origin, such as wool or silk, or of vegetable origin such as cellulosic materials of cotton, hemp, flax, linen, jute or ramie, and also of semi-synthetic materials, such as regenerated cellulose, for example, artificial silk, viscose, including staple fibers of regenerated cellulose, or synthetic materials obtainable by polymerization or copolymerization, for example, polyacrylonitrile such as "Orlon," "Pan" and "Acrylan," or those obtainable by polycondensation, such as polyesters, for example, "Terylene," "Dacron" and above all polyamides, such as nylon or "Perlon."

(d) Coating or dressing compositions for textiles or paper, for example, those based on starches or casein, or those based on artificial resins, for example, based on vinyl acetate or derivatives of acrylic acid.

(e) Lacquers and films of various compositions, for example, those of acetyl-cellulose, vinyl acetate, alkyd resins or nitro-cellulose. An especially important use for the new hydroxy-ketones is incorporation in packing materials, especially the known transparent foils of regenerated cellulose (viscose) acetyl-cellulose or polyethylene. It is usually of advantage to incorporate the light-protection agent in the compositions from which these foils are made.

(f) Natural or synthetic resins, for example, epoxy-resins, polyester resin, polyene resins, aldehyde resins such as urea-formaldehyde or melamine-formaldehyde condensation products, and also emulsions of synthetic resins, for example, oil-in-water or water-in-oil emulsions. In these cases it is of advantage to add the light-protection agent before or during the polymerization or polycondensation.

(g) Hydrophobic materials containing oils, fats or waxes, such as candles, floor polishes, floor stains or other wood stains, furniture polishes and especially those intended for the treatment of light, if desired, bleached wood surfaces.

(h) Cosmetic preparations, especially anti-sunlight oils and creams. The use of the new hydroxy-ketones for this purpose is especially desirable when it is desired to afford protection, not only against the harmful skin-reddening action of the rays having wavelengths of 270 to 320 m$\mu$, but also against the bronzing of the skin caused by ultra-violet rays of higher wavelengths up to about 400 m$\mu$.

(i) For making filter layers for photographic purposes, especially for color photography.

The light-protection agents can be applied to the fibrous materials mentioned under (b) and (c) by methods which are the same as or similar to those used for the known dispersion dyestuffs (cellulose acetate silk dyestuffs).

It will be understood that the new hydroxy-ketones are suitable as light-protecting agents not only for undyed but also for dyed or pigmented materials. In the latter cases the light-protective action also protects the dyestuffs, so that in some cases a very considerable improvement in fastness to light results. If desired, the treatment with the light-protection agents may be combined with the dyeing or pigmenting process.

Depending on the nature of the material to be treated and on requirements with regard to the degree of activity and durability and other requirements, the proportions of the light-protection agent to be incorporated in the material varies within rather wide limits, for example, from about 0.01 to 10%, and advantageously 0.1 to 2%, on the weight of the material which is to be directly protected against ultraviolet rays.

The following examples illustrate the invention, the parts and percentages being by weight unless otherwise stated, and the relationship of parts by weight to parts

Example 1

22 parts of 1:3-dihydroxybenzene and 20.4 parts of terephthalic acid dichloride are stirred in 350 parts of nitrobenzene. There are added at 15° C. 28 parts of aluminum chloride, during which the temperature must not rise above 25° C. The whole is then stirred for 2 hours at 75–80° C., and the mixture is then poured into 500 parts of N-hydrochloric acid which contains 50 parts of ice. The whole is stirred for 15 minutes, allowed to stand and the water is decanted off. The residue is washed 3 times with 700 parts of water each time, and the reaction mixture is then subjected to steam distillation. There are obtained 31 parts of light yellow crystals. Upon recrystallization from a mixture of acetone and water the product of the Formula 1 crystallizes in fine needles melting at 311–314° C.

*Analysis.*—Calculated: C=68.57, H=4.03. Found: C=68.64, H=4.18. $\lambda_{max}$=255 m$\mu$ ($\epsilon$=16800), 298 m$\mu$ ($\epsilon$=22000), 333 m$\mu$ ($\epsilon$=21750).

Example 2

11 parts of 1:3-dihydroxybenzene and 9.65 parts of furane dicarboxylic acid dichloride are stirred in 50 parts of nitrobenzene. There are then added at 10° C. 14 parts of aluminum chloride, and the temperature is gradually raised to 90–100° C. After stirring the mixture at that temperature for one hour, it is mixed with ice and hydrochloric acid, then washed neutral and subjected to steam distillation. There are obtained 13 parts of yellow crystals. After recrystallization from a mixture of alcohol and water the product of the formula (4) 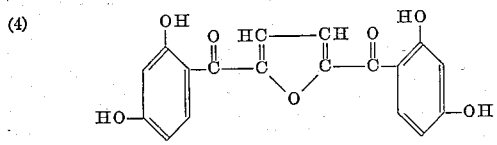

melts at 269–270° C.

*Analysis.*—Calculated: C=63.53, H=3.55. Found: C=63.45, H=3.71. $\lambda_{max}$=290 m$\mu$ ($\epsilon$=17850), 369 m$\mu$ ($\epsilon$=27750).

Example 3

20.4 parts of terephthalic acid dichloride and 22 parts of resorcinol are stirred in 150 parts of benzene at 50° C., while 15.8 parts of pyridine are introduced dropwise in the course of 40 minutes. The mixture is stirred for a further ¼ hour, and then subjected to steam distillation. The white product so obtained is filtered off with suction and recrystallized once from a mixture of dimethylformamide and water. There is obtained the compound of the formula (5) 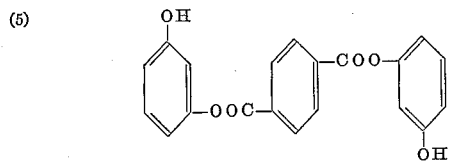

which melts at 216–218° C.

*Analysis.*—Calculated: C=68.57, H=4.03. Found: C=68.46, H=3.91.

3.5 parts of the resulting diester are heated with 4.2 parts of aluminum chloride for 20 minutes at 160–165° C. The reaction mixture is then introduced into ice water containing hydrochloric acid, and the whole is stirred for ¼ hour at room temperature, care being taken to maintain the hydrochloric acid reaction of the mixture. The precipitated product is filtered off with suction, washed neutral and dried. The product has the Formula 1 and melts at 310–313° C. It is identical with the product obtained as described in Example 1.

Example 4

11 parts of 1:3-dihydroxybenzene and 14 parts of diphenyl-4:4'-dicarboxylic acid dichloride are stirred in 250 parts of nitrobenzene. Then 15 parts of aluminum chloride are added at 5–10° C. The temperature is then raised in the course of ½ hour to 65° C. stirring is continued for 3 hours at the same temperature. As only little hydrogen chloride is split off, the mixture is stirred for a further 20 hours at 80° C. It is then poured into 600 parts of N-hydrochloric acid, and the mixture is stirred for 15 minutes at room temperature, filtered with suction, and the filter residue is washed with water until the washings are neutral. The reaction product is then subjected to steam distillation in order to remove residual nitrobenzene. The mixture is then filtered with suction and the filter residue is dried. There are obtained approximately 12 parts of the compound of the formula (6) 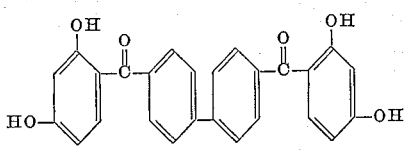

For purification the product is recrystallized from a mixture of dimethyl-formamide and water. The product, as purified for analysis, melts at 228–229° C., and contains two molecules of water of crystallization.

Calculated: C=67.52, H=4.80. Found: C=68.09, H=4.71.

Its ultra-violet absorption characteristics in dimethyl-formamide are as follows: $\lambda_{max}$=298 m$\mu$ ($\epsilon$=32300), 336 m$\mu$ ($\epsilon$=30400).

Example 5

11 parts of 1:3-dihydroxybenzene and 10.2 parts of pyridine-2:5-dicarboxylic acid dichloride are stirred in 240 parts of nitrobenzene. 15 parts of almunium chloride are added at 15° C., the temperature not being allowed to rise above 25° C. The whole is then stirred for 12 hours at 65–70° C. and the mixture is poured into 250 parts of N-hydrochloric acid and 30 parts of ice. The whole is stirred for 15 minutes, allowed to stand and then the water is decanted off. The residue is washed three times with 500 parts of water each time, and is then subjected to steam distillation.

By working up in the usual manner there are obtained 14.7 parts of pale yellow crystals. When recrystallized from a mixture of acetone and water, the product of the formula (7) 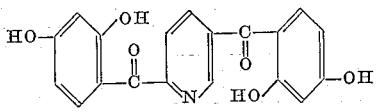

crystallizes in the form of fine needles melting at 275–276.5° C.

*Analysis.*—Calculated: C=64.96, H=3,73, N=3.99. Found: C=64.85, H=3.86, N=4.15. $\lambda_{max}$=336 m$\mu$ ($\epsilon$=21000).

Example 6

27.6 parts of 1:3-dimethoxybenzene and 20.4 parts of terephthalic acid dichloride are stirred in 500 parts of nitrobenzene. 30 parts of aluminum chloride are added at 5° C. and the temperature is then gradually raised to 60–65° C. The mixture is then stirred at that temperature for 20 hours, and poured on to 1200 parts of N-hydrochloride acid and 200 parts of ice, and stirred for 15 minutes at room temperature. The mixture is then filtered with suction through a cloth filter and washed with water until the washings are neutral. The filter residue is subjected to steam distillation, and after working up the product in the usual manner 30 parts of pale yellow needles are obtained. After being recrystallized twice from dimethyl-formamide the product has the formula (8) 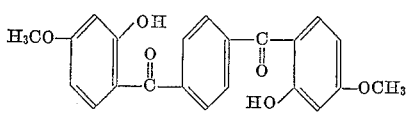

and melts at 261–264° C.

*Analysis.*—Calculated: C=69.83, H=4.03. Found: C=69.87, H=4.80. $\lambda_{max}$=294 m$\mu$ ($\epsilon$=22200), 332 m$\mu$ ($\epsilon$=20000).

A compound having similar properties is obtained when the 1:3-dimethoxybenzene used as starting material is replaced by the equivalent amount of 1:3-diethoxybenzene.

*Example 7*

7.5 parts of the compound obtained as described in Example 1 are introduced at 15–20° C. in the course of ¾ hour into 80 parts of oleum of 20% strength, while stirring. The whole is then further stirred for ½ hour at 15–20° C., the mixture is poured on to 200 parts of ice, and sodium chloride is added to the brown solution. The precipitated product is filtered off with suction, and the filter residue is dissolved in 60 parts of hot water. Upon cooling, slightly yellowish crystals of the formula (9) 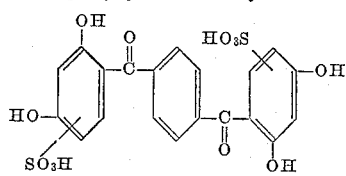

crystallize out. The crystals melt above 350° C. The yield amounts to 10.5 parts.

The product can be further purified by recrystallization from alcohol.

*Example 8*

A film approximately 40 microns thick is produced from a solution of 10% strength of acetyl-cellulose in acetone, which solution contains 1%, calculated on the acetyl-cellulose, of the diketone of the Formula 1 and obtained as described in Example 1. After drying the film, it has the following percentage light transmission:

| Wavelengths in m$\mu$ | Percentage light transmission | |
|---|---|---|
| | Unexposed | After illumination for 100 hours in a fadeometer |
| 270 to 340 | 0 | 0 |
| 350 | 0.5 | 0.5 |
| 360 | 3 | 4 |
| 370 | 14 | 17 |
| 380 | 42 | 44 |
| 390 | 62 | 73 |

*Example 9*

10,000 parts of a polyamide in the form of chippings, and which has been obtained in known manner from hexamethylene diamine adipate, are mixed with 30 parts of titanium dioxide (rutile modification) and 50 parts of the compound of the formula

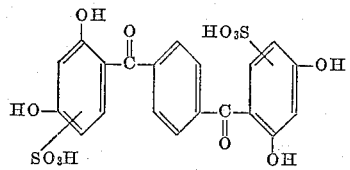

obtained as described in Example 7 in a rotary drum for 12 hours. The chippings so treated are melted in a vessel heated by means of oil to 300–310° C., after displacing the atmospheric oxygen by means of superheated steam, and the melt is stirred for ½ hour. The melt is then extruded through a spinning jet under 5 atmospheres pressure of nitrogen, and the spun and cooled filaments are wound on a spool. The tensile strength of the filaments so obtained, after stretching, is diminished by exposure to light much less than the tensile strength of filaments prepared in the same manner, except that the sulfonated diketone is omitted.

*Example 10*

In a hollander a paper pulp is produced which consists of 150 parts of bleached sulfite or sulfate cellulose, 60 parts of zinc sulfite, 6 parts of aluminum sulfate, 3 parts of a finely dispersed aqueous paste containing 25% of the azo-pigment of the formula

(10) 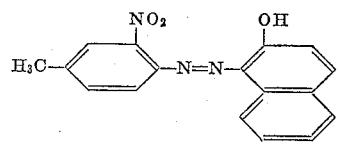

and about 5000 parts of water. Paper made from the above pulp is introduced into a bath prepared from 100 parts of a pulverulent hardenable water-soluble condensation product of 1 mol of melamine with about 2 mols of formaldehyde, and 100 parts by volume of a mixture obtained from a solution of 1 part of the light protection agent of Formula 1 obtained as described in Example 1 in 19 parts by volume of ethanol followed by dilution with water to make 100 parts by volume.

After removing the excess of resin solution the paper is dried.

The paper produced in the above manner is traced on to a support consisting of tissue paper impregnated with a melamine-resin of the above constitution, a layer of phenol paper and filter paper impregnated with the melamine-resin of the above constitution as intermediate layer for 10 minutes at 140–150° C. and under a pressure of 75 kilograms per square centimeter.

The laminate so produced exhibits, after exposure in a fadeometer, a considerably better fastness to light than a laminate which does not contain the light protection agent of the Formula 1.

When the light protection agent used in this example is incorporated only in the melamine resin bath which is used to impregnate the tissue paper, a similarly good improvement in fastness to light is obtained.

*Example 11*

In a hollander a paper pulp is prepared consisting of 150 parts of bleached sulfite cellulose, 7.5 parts of china clay, 6 parts of aluminum sulfate, 3 parts of the sulfonation product of the dyestuff of the formula

(11) 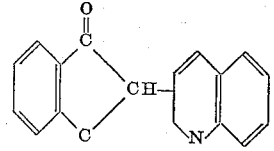

and about 5000 parts of water.

Paper prepared from the above pulp is coated at room temperature with a coating composition consisting of 900 parts of a mixture of 28% of polyvinyl acetate, 2 parts of an anhydrous emulsifying agent and 70 parts of water, and 10 parts of the light protection agent of the Formula 1 obtained as described in Example 1 and dissolved in 90 parts of water, and the coating is dried at 50–60° C.

The paper so treated, after being exposed in a fadeometer, has a better fastness to light than the same paper prepared without the addition of the light protection agent.

Example 12

50 parts of an alkyd-melamine bakeable lacquer, consisting of 47.5 parts of a coconut oil fatty acid-modified non-drying alkyd resin, 31.6 parts of toluene and 12.5 parts of a concentrated solution in butanol of a melamine-formaldehyde condensation product partially etherified with butanol, are mixed at room temperature for 10 minutes with a solution of 0.15 part of copper phthalocyanine-tetramethoxy-propyl sulfonamide and 0.3 part of the light protection agent of Formula 1 obtained as described in Example 1 in 10 parts of acetone.

A sheet of tin foil is coated with an 0.2 mm. thick wet film of the above mixture by means of a film drawing apparatus, and the coating is then baked for one hour at 120° C. After cooling the coated material, the coating thereon is covered with a second coating of the same thickness of a mixture having the same composition, except that the coloring matter is omitted. After baking the second coating, the blue colored double layer coating, when exposed to light in a fadeometer, exhibits a better fastness to light than a similar coating not containing the light protection agent.

Example 13

50 parts of a vinyl resin lacquer, consisting of 240 parts of a stabilized polyvinyl chloride (for example, 228 parts of "Vinylite VMCH" of the Union Carbide and Carbon Corporation, stabilized with 12.4 parts of "Stabilizer No. 52" of Advance Solvents), 24.6 parts of dioctyl phthalate, 367.5 parts of methyl ethyl ketone and 267.5 parts of toluene, are mixed at room temperature for 10 minutes with a solution of 0.133 part of copper phthalocyanine-tetramethoxy-propyl sulfonamide and 0.133 part of the light protection agent of the Formula 1 obtained as described in Example 1 or 3 in 11.5 parts of acetone.

With the above mixture a sheet of tin foil is coated to form a wet film 0.2 mm. thick by means of a film-drawing apparatus, and then the coating is dried for 5 minutes at 120° C. Upon the coating so obtained, after being cooled, a second coating of the same thickness is applied with a mixture of the same composition, except that the coloring matter is omitted. The second coating is then dried for 5 minutes at 120° C. The resulting blue-colored double layer coating, after being exposed to light in a fadeometer, has a better fastness to light than a similar coating produced without the light-protection agent of the Formula 1.

Example 14

5 parts of the compound of the Formula 1, 10 parts of adipic acid isopropyl tetrahydrofurfuryl ester and 1 part of glycerine monostearate are dissolved in 84 part of ethyl alcohol. There is obtained a solution which affords protection against the rays of the sun and has insect-repellent properties, and is very suitable for rubbing onto exposed parts of the body.

Example 15

15 parts of the condensation product of Formula 1 described in Example 1 are dissolved in 96 parts of ethyl alcohol, and 0.5 part of a perfume oil is added. 40 parts of the solution so obtained are charged together with 60 parts of a mixture of equal parts of trichloro-monofluoromethane and dichloro-difluoromethane into a pressure container provided with a valve. In this manner an aerosol spray composition is obtained which can be used as a protection against sunlight.

Example 16

10 parts of adipic acid isopropyl tetrahydrofurfuryl ester, 5 parts of benzoic acid diethylamide, 8 parts of phthalic acid dimethyl ester and 2 parts of the condensation product of Formula 1, described in Example 1, are dissolved in 36 parts of ground nut oil and 36 parts of paraffin oil. The resulting mixture affords protection against sunlight and possesses insect-repelling properties.

Example 17

2 parts of the condensation product of the Formula 1 described in Example 1, 10 parts of glycerine monostearate, 4 parts of cetyl alcohol, 1 part of sodium cetyl sulfate, 1 part of stearic acid and 5 parts of glycerine are intimately mixed together, and the mixture is emulsified in 75 parts of water. The resulting emulsion is very suitable as a non-fattening skin cream and protects the treated parts against the rays of the sun.

Example 18

5 parts of adipic acid isopropyl tetrahydrofurfuryl ester, 5 parts of toluylic acid diethylamide, 3 parts of the condensation product of the Formula 1 described in Example 1, 6 parts of cetyl alcohol, 14 parts of white petroleum jelly, 10 parts of white beeswax, 14 parts of lanolin, 3 parts of cocoa butter, 39.7 parts of water and 0.3 part of sodium benzoate are intimately mixed together to form an excellent protective cream against sunlight and having insect repellent properties.

What is claimed is:

The hydroxy-ketone of the formula

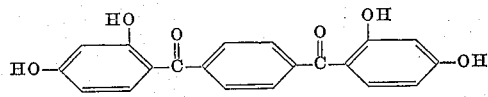

References Cited in the file of this patent

Yamashita, Chem. Abstracts, vol. 27, p. 3927 (1933).
Blicke et al. (I): J. Am. Chem. Soc., vol. 58, pp. 276–8 (1936).
Blicke et al. (II): J. Am. Chem. Soc., vol. 60, pp. 2283–5 (1938).
Dutt: Beilstein (Handbuch, 4th edition), vol. 17, page 498 (1952).

UNITED STATES PATENT OFFICE
CERTIFICATE OF CORRECTION

Patent No. 3,123,647            March 3, 1964

Max Duennenberger et al.

It is hereby certified that error appears in the above numbered patent requiring correction and that the said Letters Patent should read as corrected below.

Column 2, line 15, for "on" read -- one --; column 6, line 38, for "almuinum" read -- aluminum --; column 8, lines 16 to 22, the formula should appear as shown below instead of as in the patent:

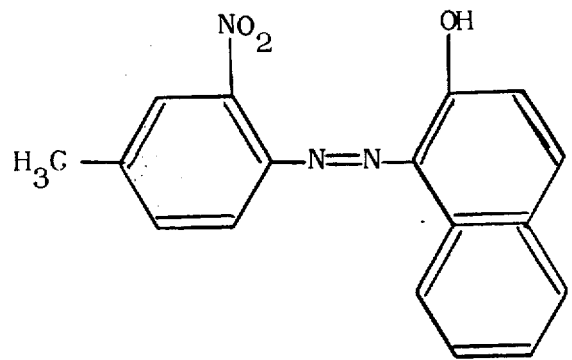

same column 8, lines 56 to 62, the formula should appear as shown below instead of as in the patent:

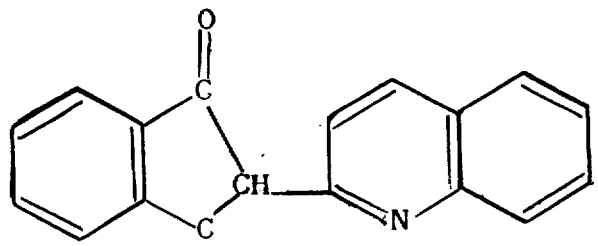

Signed and sealed this 22nd day of December 1964.

(SEAL)
Attest:

ERNEST W. SWIDER
Attesting Officer

EDWARD J. BRENNER
Commissioner of Patents